(12) United States Patent
Suen et al.

(10) Patent No.: US 10,826,705 B2
(45) Date of Patent: Nov. 3, 2020

(54) COMPACT STATE DATABASE SYSTEM

(71) Applicant: International Business Machines Corporation, Armonk, NY (US)

(72) Inventors: Chun Hui Suen, Singapore (SG); Yu Chin Fabian Lim, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/218,847

(22) Filed: Dec. 13, 2018

(65) Prior Publication Data

US 2020/0195441 A1 Jun. 18, 2020

(51) Int. Cl.
  *H04L 29/06* (2006.01)
  *H04L 9/32* (2006.01)
  *H04L 9/06* (2006.01)
  *G06F 16/182* (2019.01)
  *G06F 16/13* (2019.01)

(52) U.S. Cl.
  CPC .......... *H04L 9/3236* (2013.01); *G06F 16/137* (2019.01); *G06F 16/1837* (2019.01); *H04L 9/0618* (2013.01); *H04L 2209/38* (2013.01)

(58) Field of Classification Search
  None
  See application file for complete search history.

(56) References Cited

U.S. PATENT DOCUMENTS

| | | | |
|---|---|---|---|
| 2017/0031676 A1* | 2/2017 | Cecchetti | H04L 9/3236 |
| 2017/0046698 A1 | 2/2017 | Haldenby et al. | |
| 2017/0243193 A1 | 8/2017 | Manian et al. | |
| 2018/0294956 A1 | 10/2018 | O'Brien et al. | |
| 2019/0102163 A1* | 4/2019 | Witherspoon | G07C 13/00 |
| 2020/0143372 A1* | 5/2020 | Liu | G06F 16/27 |
| 2020/0159697 A1* | 5/2020 | Wood | G06F 16/1837 |

OTHER PUBLICATIONS

Fu Xiang et al., "JCLedger: A Blockchain Based Distributed Ledger for JointCloud Computing," 2017 IEEE 37th International Conference on Distributed Computing Systems Workshops (ICDCSW), Year: 2017, pp. 289-293.

Lijun Wu et al, "Democratic Centralism: A Hybrid Blockchain Architecture and Its Applications in Energy Internet," 2017 IEEE International Conference on Energy Internet (ICEI), 2017, pp. 176-181.

(Continued)

*Primary Examiner* — Andrew J Steinle

(57) ABSTRACT

An example operation may include one or more of receiving, by a full storage peer of a blockchain network, a blockchain transaction, executing chaincode to create a new world state for a blockchain, transferring, in response to the blockchain transaction, partial Merkle tree hashes to one or more partial storage peers, the partial Merkle tree hashes corresponding to the blockchain transaction, verifying a current world state hash with the partial Merkle tree hashes, receiving, by the one or more partial storage peers, chaincode arguments, executing chaincode on the chaincode arguments to generate a new world state, calculating a new world state hash, and performing consensus, by the full storage peer and the one or more partial storage peers, on the new world state hash.

20 Claims, 16 Drawing Sheets

(56) References Cited

OTHER PUBLICATIONS

Marco Conoscenti et al., "Peer to Peer for Privacy and Decentralization in the Internet of Things," 2017 IEEE/ACM 39th International Conference on Software Engineering Companion (ICSE-C), Year: 2017, pp. 288-290.

Pradip Kumar Sharma et al., "A Software Defined Fog Node based Distributed Blockchain Cloud Architecture for IoT," IEEE Access, 2017, vol. PP, Issue: 99, pp. 1-1.

Pradip Kumar Sharma et al., "DistBlockNet: A Distributed Blockchains-Based Secure SDN Architecture for IoT Networks," IEEE Communications Magazine, Year: 2017, vol. 55, Issue: 9, pp. 78-85.

Wei Xin et al. "On Scaling and Accelerating Decentralized Private Blockchains," 2017 IEEE 3rd international conference on big data security on cloud (bigdatasecurity), IEEE international conference on high performance and smart computing (HPSC), and IEEE international conference on intelligent data and security (ids), Year: 2017, pp. 267-271.

* cited by examiner

550

COMPACT STATE DATABASE SYSTEM

TECHNICAL FIELD

This application generally relates to a database storage system, and more particularly, to a compact state database system.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, in some cases a centralized database may provide limited access to data because only one copy of the data is maintained by the database. Furthermore, in cases where a database storage system has minimal to no data redundancy, data that is unexpectedly lost may be difficult to retrieve other than through manual operation from back-up storage.

Conventionally, a centralized database is limited by a centralized requirement to store a complete world state at all times, which increases storage requirements for an increasing number of transactions. Distributed systems include additional redundancy, which then require multiple (full or partial) copies of the world state. As such, what is needed is a solution to overcome these significant drawbacks.

SUMMARY

One example embodiment provides a system that includes a blockchain network which includes a full storage peer and one or more partial storage peers. The one or more partial storage peers are coupled to the full storage peer. The full storage peer is configured to receive a blockchain transaction, execute chaincode to create a new world state for a blockchain, and transfer, in response to the blockchain transaction, partial Merkle tree hashes that correspond to the blockchain transaction. The one or more partial storage peers are each configured to receive the partial Merkle tree hashes, verify a current world state hash with the partial Merkle tree hashes, receive chaincode arguments, execute chaincode on the chaincode arguments to generate a new world state, calculate a new world state hash, and participate in consensus on the new world state hash.

Another example embodiment provides a method that includes one or more of receiving, by a full storage peer of a blockchain network, a blockchain transaction, executing chaincode to create a new world state for a blockchain, transferring, in response to the blockchain transaction, partial Merkle tree hashes to one or more partial storage peers, the partial Merkle tree hashes corresponding to the blockchain transaction, verifying a current world state hash with the partial Merkle tree hashes, receiving, by the one or more partial storage peers, chaincode arguments, executing chaincode on the chaincode arguments to generate a new world state, calculating a new world state hash, and performing consensus, by the full storage peer and the one or more partial storage peers, on the new world state hash.

A further example embodiment provides a non-transitory computer readable medium comprising instructions, that when read by a processor, cause the processor to perform one or more of receiving, by a full storage peer of a blockchain network, a blockchain transaction, executing chaincode to create a new world state for a blockchain, transferring, in response to the blockchain transaction, partial Merkle tree hashes to one or more partial storage peers, the partial Merkle tree hashes corresponding to the blockchain transaction, verifying a current world state hash with the partial Merkle tree hashes, receiving, by the one or more partial storage peers, chaincode arguments, executing chaincode on the chaincode arguments to generate a new world state, calculating a new world state hash, and performing consensus, by the full storage peer and the one or more partial storage peers, on the new world state hash

DETAILED DESCRIPTION

Figure 1A:
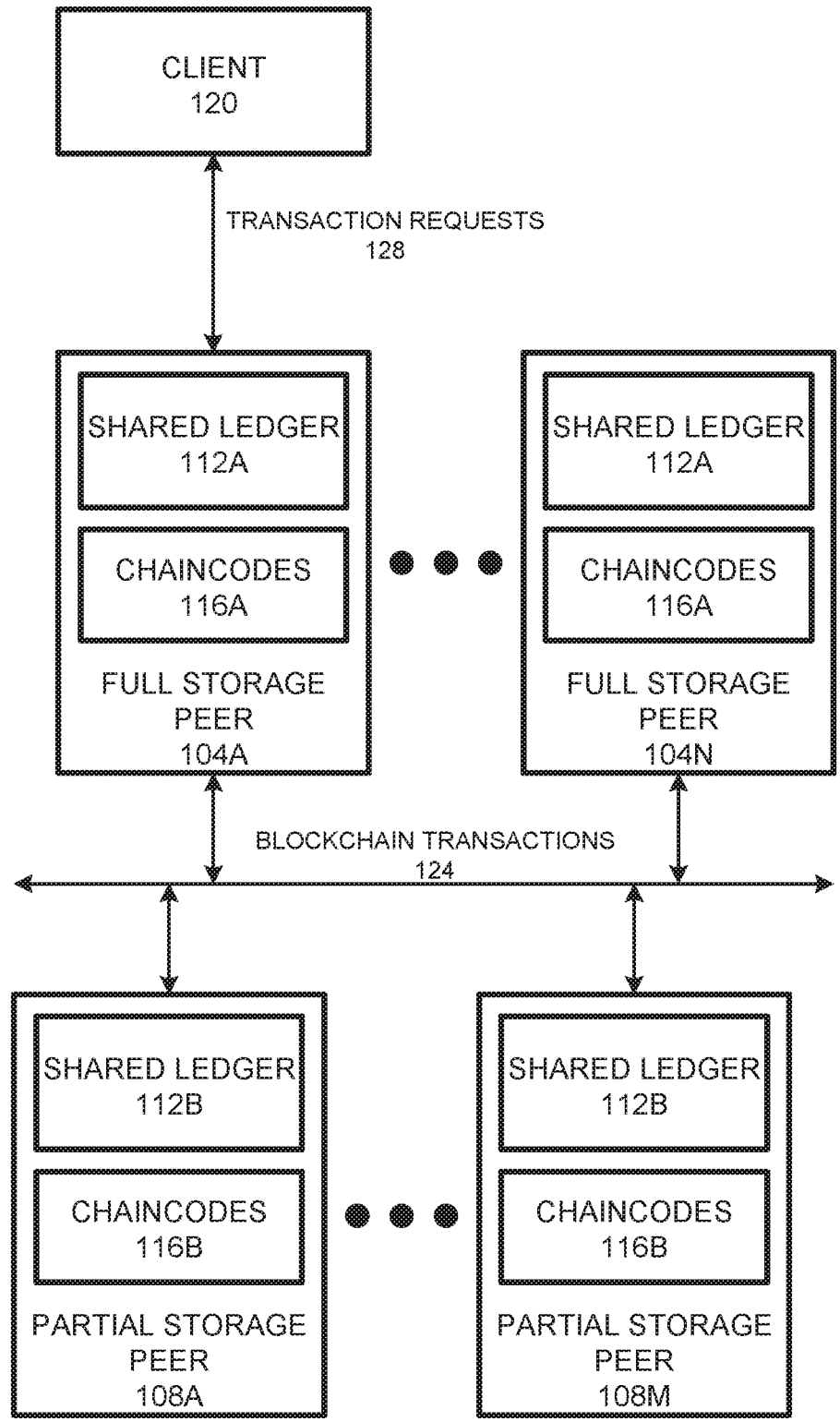
FIG. 1A illustrates a logic network diagram of a blockchain network including full and partial storage peers, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which require less world state storage in blockchain systems.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include support for temporary nodes/peers in ad-hoc blockchain networks, support for "lightweight" devices with limited storage resources (e.g. portable or mobile devices, etc), and reducing the amount of data to be transferred and stored within blockchain networks. The new technical way consists of defining a new type of node/peer: a partial storage peer, that interoperates with conventional nodes/peers in order to process transactions in a reduced data environment. The present application provides an ability to manage an explosion of data on an operational blockchain. By restricting the storage of all the blockchain data to a specific set of nodes/peers that have the infrastructure capability to do so, this allows the partial storage peers to only store data that concerns them.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, decentralization, and the like, which are further described herein. According to various aspects, the new technical way to address issues encountered in transferring and storing data within blockchain networks is implemented due to immutability, smart contracts/chaincodes, and decentralization—which are inherent and unique to blockchain technology.

In particular, with respect to immutability/accountability, storing data and recording most blockchain transactions in a shared ledger creates an immutable and un-falsifiable record of blockchain transactions. By nature of blockchain technology, this information cannot be overridden or removed from the blockchain. The information can thus be used for accountability or legal purposes.

The present application describes unique logic to communicate specific data between full storage peers and partial storage peers to allow the partial storage peers to process blockchain transactions without the data overheads associated with the full world state.

With respect to decentralization, the present application differentiates full storage peers from partial storage peers, each of which has its own copy of the shared ledger and specific chaincode to execute processes described herein.

One of the benefits of the example embodiments is that it improves the functionality of a computing system by significantly reducing the amount of data transferred and stored on blockchain networks. It provides methods to transfer/store a subset of world state hashes instead of the complete world state hash to partial storage peers. By reducing network congestion, a larger number of nodes/peers may be supported in blockchain networks, which may include additional/different organizations, as well.

Through the blockchain system described herein, a computing system can perform functionality without a single point of compromise because of the mechanisms inherent to blockchain. For example, all transactions and transaction results are stored in an immutable shared ledger by each major component that is a blockchain peer. Tampering is readily detectable as a shared ledger would not match other shared ledgers of the blockchain network.

The example embodiments provide numerous benefits over a traditional database. For example, a traditional database could not be used to implement the example embodiments because traditional databases utilize centralized storage. Accordingly, the example embodiments provide for a specific solution to a problem in the arts/field of network growth and scalability.

The example embodiments also change how data may be stored within a block structure of the blockchain. For example, block metadata may need to be modified or augmented to store certain states of the algorithms including identity of the node/peer and an identification of whether a node/peer is a full storage peer, or not.

The present application addresses a data storage problem within blockchain networks. As the number of nodes/peers and transactions increase, the amount of data which must be read, processed, and stored increases dramatically. Every node/peer stores all history and snapshots for the blockchain. Logs and hashes of all data blocks are stored for the blockchain itself, as well as the world state cache that maintains state required for chaincode and smart contracts to validate. This has called into question whether all nodes/peers always need to maintain the full world state at all times.

The present application describes a solution to this by providing two types of nodes/peers: full storage peers that store the world state for the blockchain in its entirety, and partial storage peers that store a minimal amount or subset of the complete world state. Both full and partial storage peers participate in consensus processes of the blockchain network.

It is important that any full storage peers to trusted at least to a degree, since it may be possible for full storage peers to deny partial storage peers from performing a validate chaincode execution operation by sending invalid or incorrect hashes. However, full storage peers are not able to deceive partial storage peers into validating a malicious transaction because the relevant data must be available to partial storage peers before they validate the transactions. A malicious transaction is one that is not true, for instance a double-spend attack.

When a client submits a transaction to the blockchain network, full storage peers perform chaincode validation - where a read/write set is generated, the read/write set is used to create a delta to a new world state through a partial Merkle tree, and one or more partial Merkle tree hashes are sent to the partial storage peers. Upon receipt of the partial Merkle tree hashes, the partial storage peers execute chaincode that utilizes the blockchain transaction log, the partial Merkle tree, and a partial world state to compute a next block. The read/write set is a set of database instructions to update the world state cache based on blockchain transactions. A Merkle tree is a hierarchical data structure used to compute a hash of the world state (to be committed in new blocks of the blockchain).

Advantageously, the present application reduces the data explosion problem that commonly occurs in blockchain networks. It enables nodes/peers to selectively maintain a partial cache of the world state (instead of caching the complete world state). Additionally, partial storage peers may choose to not store data from other organizations within the blockchain network, due to storage limitations in the partial storage peer, privacy, and liability concerns.

FIG. 1A illustrates a logic network diagram of a blockchain network 100 including full and partial storage peers, according to example embodiments. Referring to FIG. 1A, the network 100 includes a client 120, one or more full storage peers 104, and one or more partial storage peers 108. The network 100 is a blockchain network and may be either a public or a permissioned blockchain network.

There may be any number of full storage peers 104 or partial storage peers 108 in a blockchain network 100. FIG. 1A illustrates N full storage peers 104, identified as full storage peer 104A through full storage peer 104N. FIG. 1A also illustrates M partial storage peers 108, identified as partial storage peer 108A through partial storage peer 108M. Full storage peers 104 are differentiated from partial storage peers 108 by whether they individually store the complete world state for the blockchain network 100. In the preferred embodiment, full storage peers 104 receive transaction requests 128 from clients 120 since full storage peers 104 each include a full copy of the blockchain world state. However, in some embodiments it may be possible for partial storage peers 108 to receive transaction requests 128 from clients 120, as long as the receiving partial storage peer 108 already has the world state.

Each of the full storage peers 104 include a copy of the shared ledger 112A for the blockchain network 100, and chaincodes or smart contracts 116A. Each of the partial storage peers 108 include a partial copy of the shared ledger 112B for the blockchain network 100, and chaincodes or smart contracts 116B. Blockchain transactions 124 are communicated between the full storage peers 104 and partial storage peers 108, as shown and described herein. In most embodiments, blockchain transactions 124 include invoke and other forms of transactions.

There are many potential uses for the disclosed methods and system. In a blockchain involving different organizations, each organization can choose to selectively store a subset of the dataset (e.g., only those relevant to the organization), while still maintaining the trustworthiness of an immutable common shared ledger 112. It allows lightweight nodes (e.g., Internet of Things (IoT) devices, mobile devices, etc.) having limited data storage to be directly connected as a part of a blockchain, bringing the technology closer to end-nodes and users. Additionally, lightweight nodes/peers may join or leave a blockchain network 100 dynamically on-demand, without having to perform a complete re-sync of the dataset. This may allow one-off or transient nodes/peers to perform easy entry/exit from a large scale ad-hoc blockchain. Partial storage peers 108 are well suited to be this type of transient node/peer.

Figure 1B:
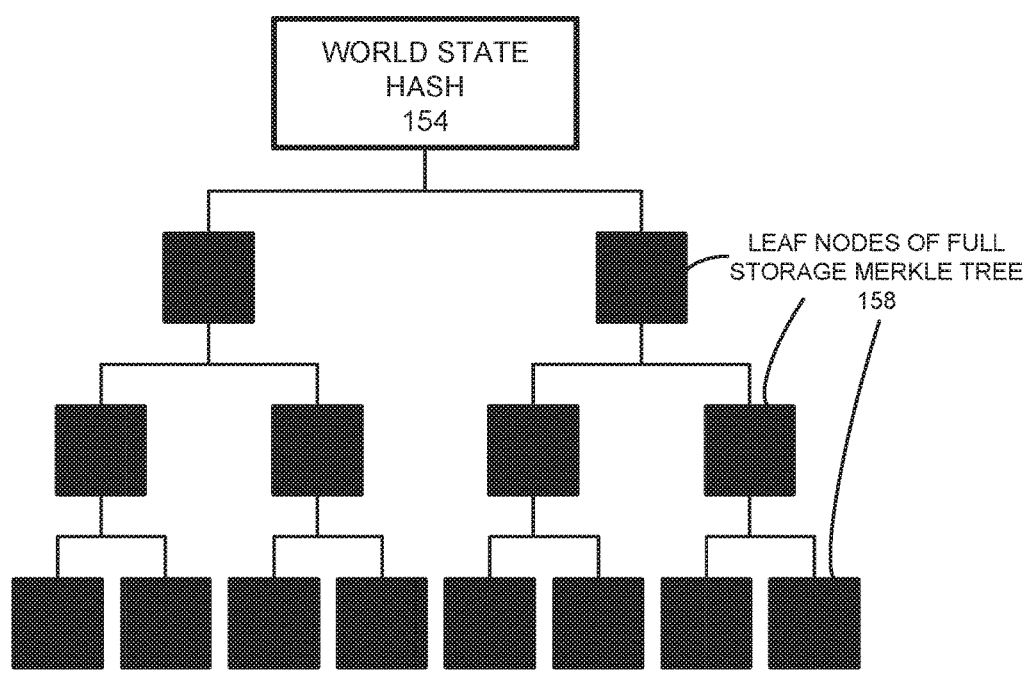
FIG. 1B illustrates a logic network diagram of a full storage peer Merkle tree, according to example embodiments.

FIG. 1B illustrates a logic network diagram of a full storage peer Merkle tree, according to example embodiments. Referring to FIG. 1B, the full storage Merkle tree 150 includes a world state hash 154, which is a hash of the complete current world state for the blockchain. The full storage peer Merkle tree 150 includes hierarchically-linked leaf nodes 158, where a hash of a higher-level leaf node is made from hashes of the lower-level leaf nodes that have a dependency relationship to the higher-level leaf node. Each full storage peer 104 includes a full storage peer Merkle tree 150.

Figure 1C:
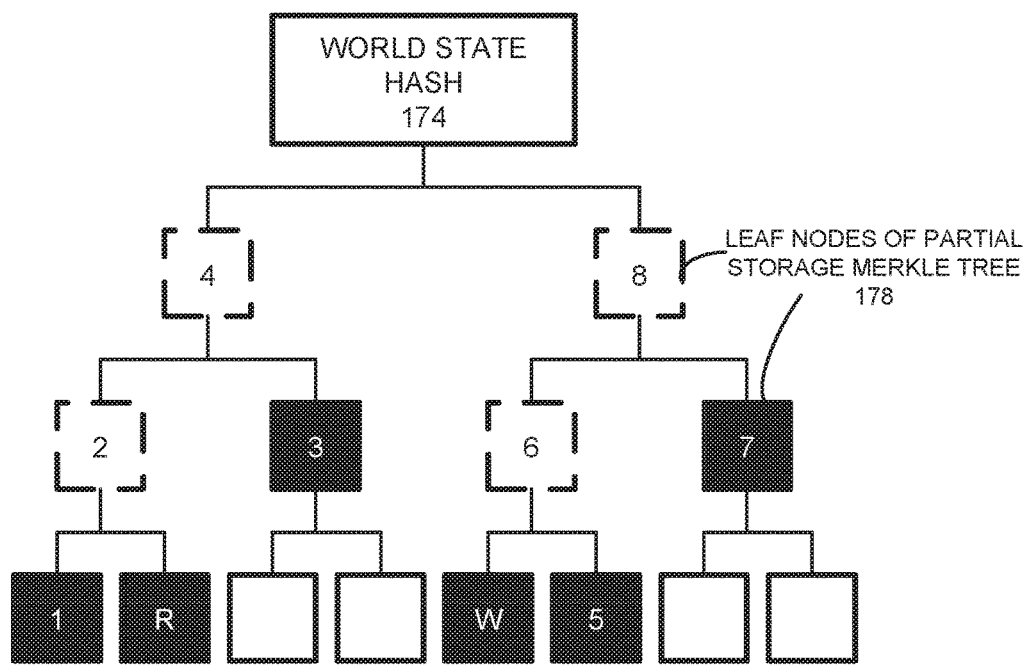
FIG. 1C illustrates a logic network diagram of a partial storage peer Merkle tree, according to example embodiments.

FIG. 1C illustrates a logic network diagram of a partial storage peer Merkle tree, according to example embodiments. Referring to FIG. 1C, the partial storage peer Merkle tree 170 includes a world state hash 174, which is a hash of the complete current world state for the blockchain. The partial storage peer Merkle tree 170 includes hierarchically-linked leaf nodes 178, where a hash of a higher-level leaf node is made from hashes of the lower-level leaf nodes that have a dependency relationship to the higher-level leaf node. Each partial storage peer 108 includes a partial storage peer Merkle tree 170.

FIG. 1C illustrates a case where a partial storage peer Merkle tree 170 includes existing leaf nodes that can be derived within partial storage peers 194. A blockchain transaction 124 requires other hashes in order to update the world state hash 174, and those hashes 182 are designated as hashes 1, 3, 5, 7, and R record 190. After executing the chaincode 116B, the hash of the W record 186 is updated and the partial storage peers 108 will need to use the hashes of W, 5, and 7 on the right side of the Merkle tree 170 to compute hashes 6 and 8. Similarly, it also does the same for hashes 2 and 4 on the left side of the Merkle tree 170. Then both hash 4 and hash 8 are combined by the partial storage peers 108 to produce the world state hash 174.

Figure 2A:
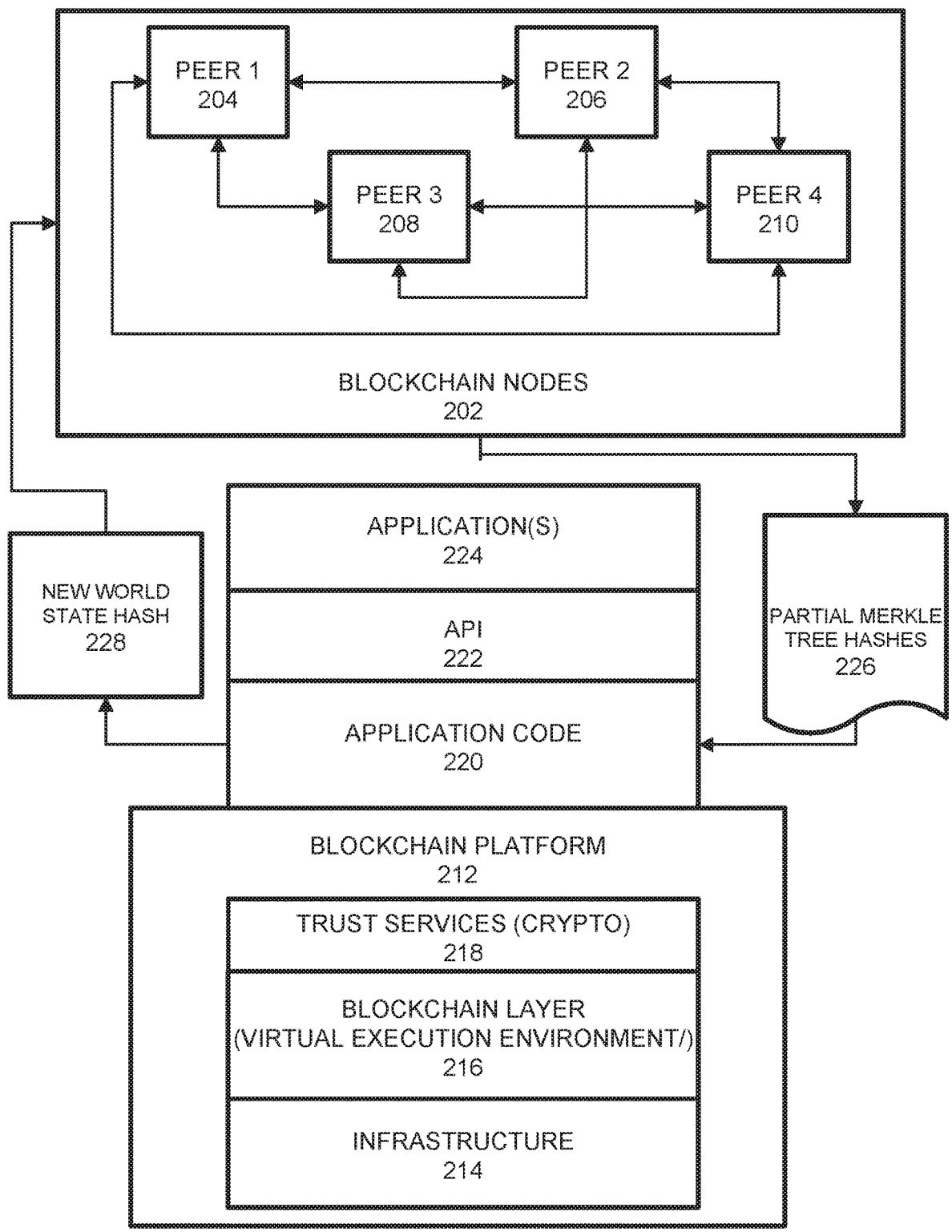
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include partial Merkle tree hashes. Partial Merkle tree hash transactions 226 may be processed by one or more processing entities (e.g., virtual machines) included in the blockchain layer 216. The result 228 may include a new world state hash. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a blockchain platform 212 may receive a blockchain transaction 226 to provide a read/write set and one or more Merkle tree hashes. One function may be to produce a new world state hash 228 by the partial storage peers, which may be provided to one or more of the nodes 204-210.

Figure 2B:
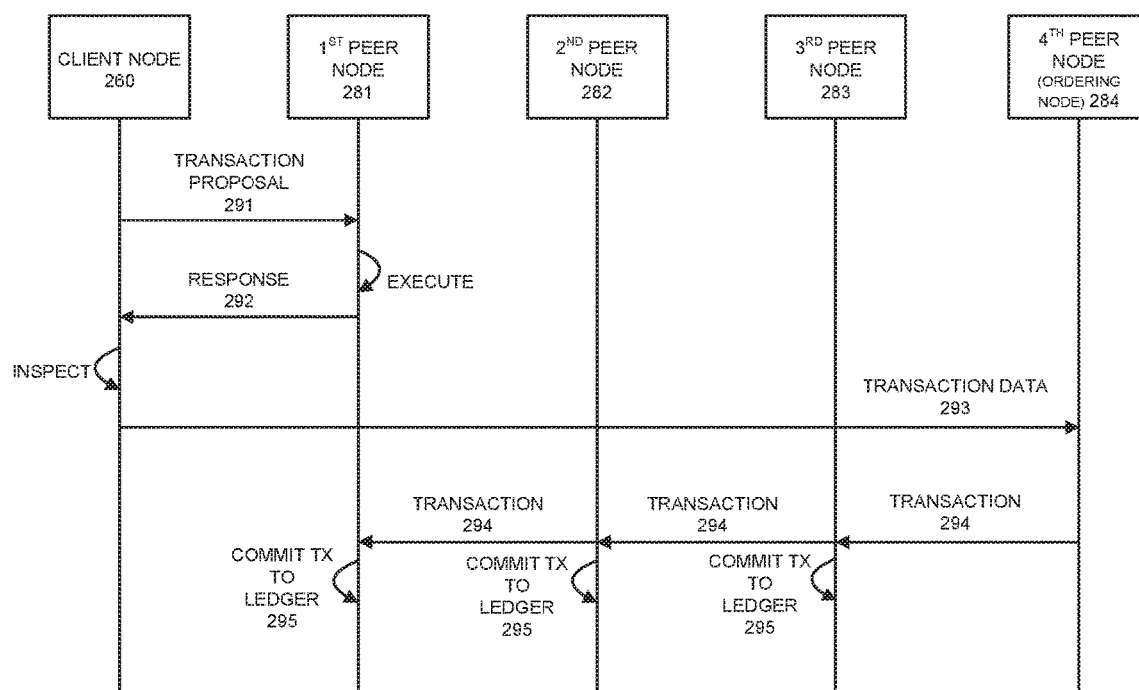
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281.

The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
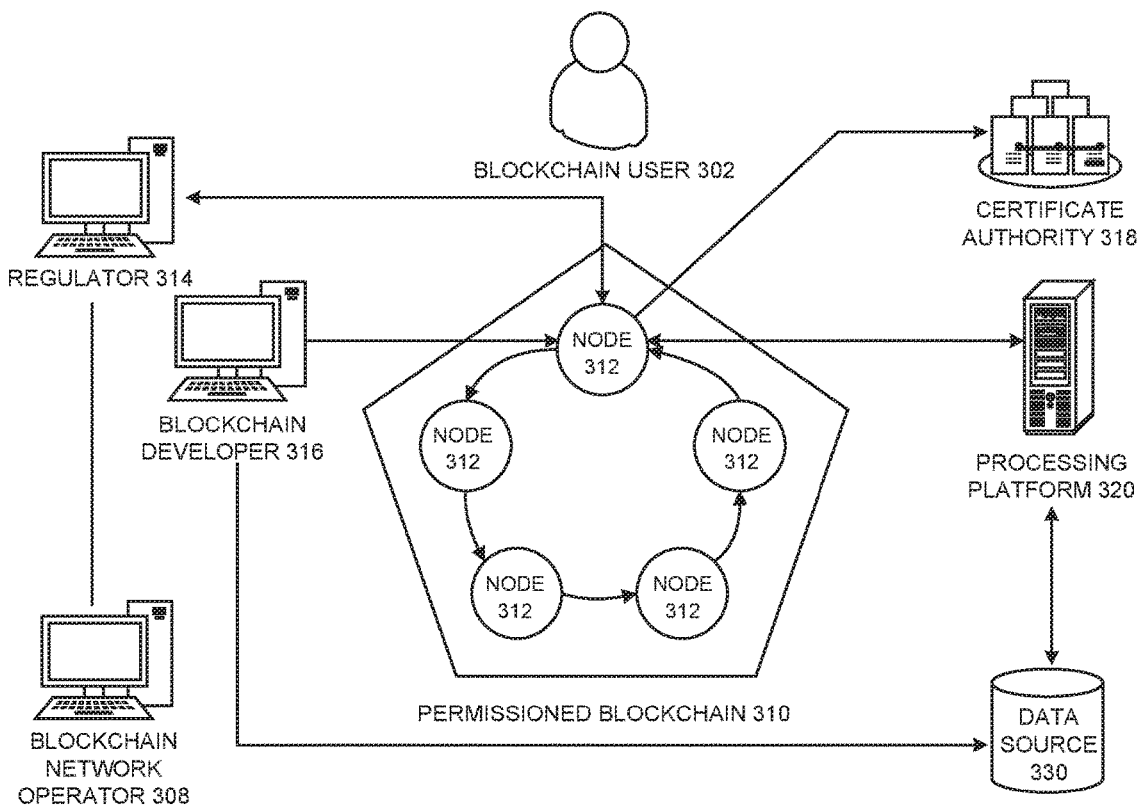
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manages member permissions, such as enrolling the regulator system 314 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
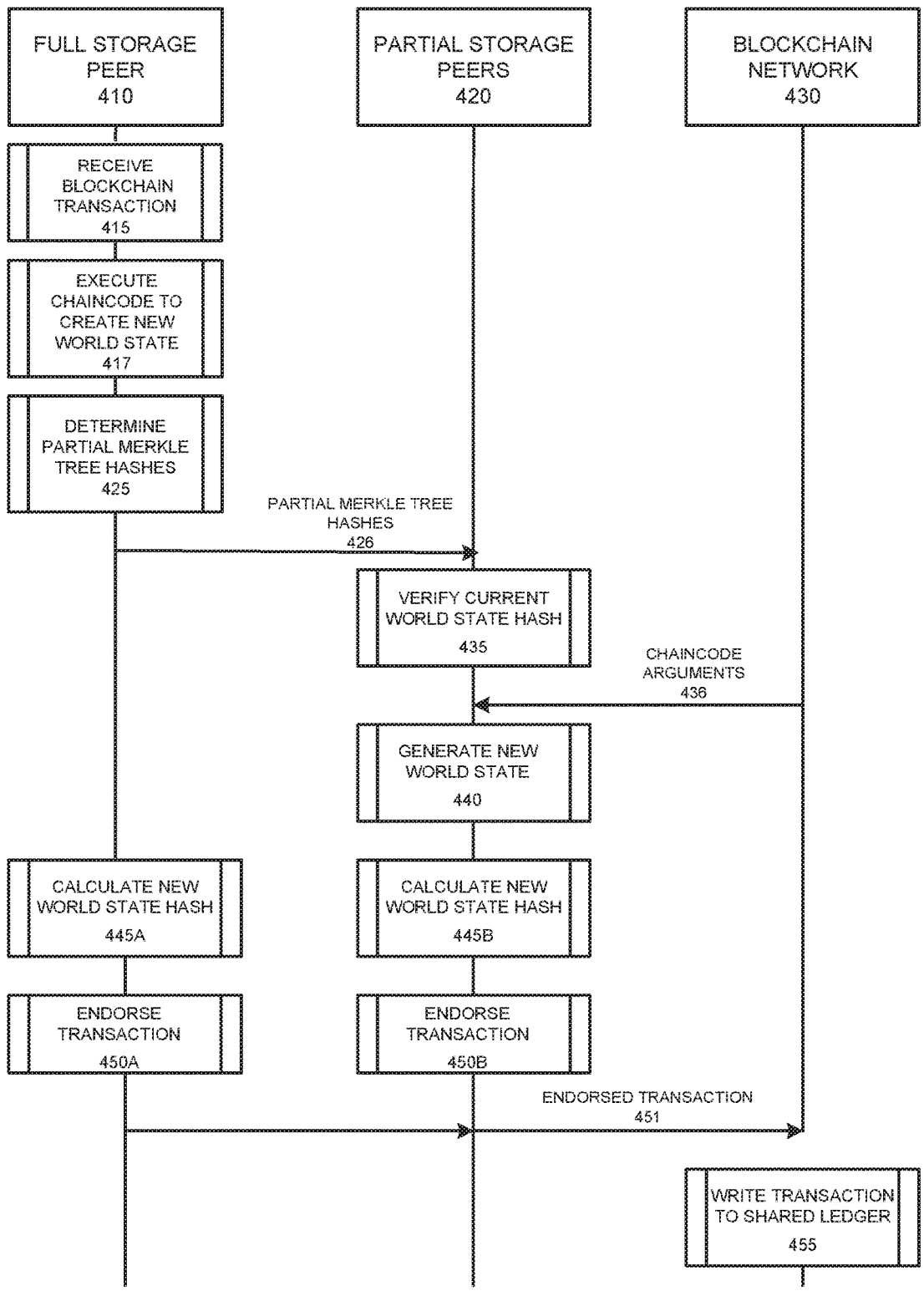
FIG. 4 illustrates a system messaging diagram for performing a blockchain transaction using full and partial storage peers, according to example embodiments.

FIG. 4 illustrates a system messaging diagram for performing a blockchain transaction using full and partial storage peers, according to example embodiments. Referring to FIG. 4, the system diagram 400 includes a full storage peer 410, one or more partial storage peers 420, and a blockchain network 430. The full storage peer 410 maintains the complete world state at all times, while the partial storage peers 420 maintain only certain hashes of interest for the current world state.

The full storage peer 410 receives a blockchain transaction 415 and executes chaincode to create a new world state 417. The full storage peer 410 also determines partial Merkle tree hashes 425 to each partial storage peer 420. Different partial storage peers 420 may receive different partial Merkle tree hashes 426, depending on the area of interest of each partial storage peer 420.

In response to receiving the partial Merkle tree hashes 426, each of the partial storage peers 420 verifies the integrity of the partial Merkle tree hashes 426 and the current world state hash 435. Partial storage peers 420 verify the integrity of the partial Merkle tree hashes 426 by calculating the current world state hash and comparing to a stored current world state hash. In order to calculate the current world state hash, partial storage peers 420 retrieve the current read set from the blockchain and compute a current read set hash. Using the current read set hash and some of the partial Merkle tree hashes 426 (hash "R" and partial Merkle tree hashes "1" and "3" in FIG. 1C), the partial storage peers 420 calculate missing hashes (hashes "2" and "4" in FIG. 1C). The partial storage peers 420 also retrieve the hash of the last leaf node on the "Write" side of the partial Merkle tree 170 (hash "8" from FIG. 1C), either from their own cache memory or from the blockchain. With the "4" and "8" hashes in-hand, the partial storage peers 420 calculate the current world state hash 174, and compare the calculated world state hash 174 to a stored current world state hash on the blockchain. If the calculated world state hash 174 matches the stored world state hash then the value current world state, and the integrity of the partial Merkle tree hashes 426, is verified.

Next, the partial storage peers 420 receive chaincode arguments 436 from the blockchain network 430. Chaincode 116 takes in these arguments (or parameters), runs them against data that is represented in the current world state, and this generates a new read/write set. Given the new read/write set, a new world state 440 may be readily produced.

At block 445B, the partial storage peers 420 calculate a new world state hash from the new world state 440. In parallel, the full storage peer 410 calculates the new world state hash 445A. The full storage peer 410 always has access to all leaf nodes 158 of the full Merkle tree 150, and therefore has the new world state and new world state hash 445A at all times.

Because the partial storage peers 420 have calculated the new world state hash 445B, they may participate in consensus to validate the blockchain transaction 415 by endorsing the transaction 450B in parallel 450A with the full storage peer 410. The full storage peer 410 and the partial storage peers 420 transmit the endorsed transaction 451 to the blockchain network 430, where the endorsed transaction 451 is committed in a new block to the shared ledger 455.

Figure 5A:
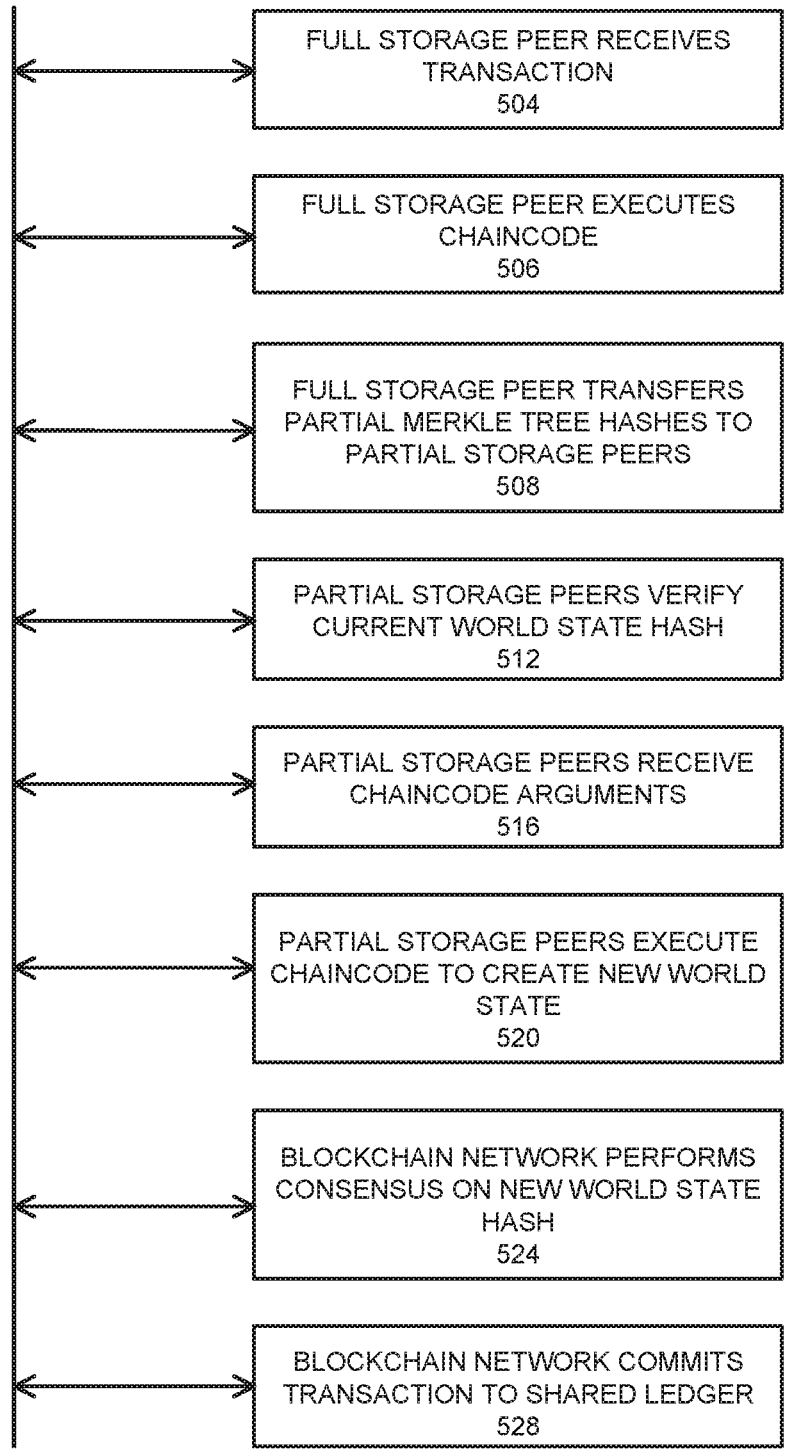
FIG. 5A illustrates a flow diagram of an example method of processing transactions in a blockchain, according to example embodiments.

FIG. 5A illustrates a flow diagram 500 of an example method of processing transactions in a blockchain, according to example embodiments. Referring to FIG. 5A, the method 500 may include one or more of the following steps.

At block 504, a full storage peer of a blockchain network receives a transaction request or blockchain transaction from a client.

At block 506, the full storage peer executes chaincode to create a new world state.

At block 508, the full storage peer 104 transfers partial Merkle tree hashes to partial storage peers. The partial Merkle tree hashes reflect an area of interest for a corresponding partial storage peer.

At block 512, partial storage peers 108 of the blockchain network verify a current world state, using the partial Merkle tree hashes.

At block 516, the partial storage peers 108 receive chaincode arguments from the blockchain network.

At block 520, the partial storage peers 108 execute chaincode, using the received chaincode arguments, to generate a new read/write set and therefore a new world state for the blockchain network.

In some cases (for example because of network issues), the partial storage peers 108 may not be able to verify the current world state. If that occurs, the partial storage peers 108 may engage in a recovery mechanism. In one embodiment, the partial storage peers 108 may request the current world state from the full storage peers 104. In another embodiment, the partial storage peers 108 may re-request partial Merkle tree hashes from a different full storage peer 104.

At block 524, each of the full 104 and partial 108 storage peers of the blockchain network 100 performs consensus on the blockchain transaction. Performing consensus in this context verifies the new world state hash among the full and partial storage peers of the blockchain network.

At block 528, the blockchain network 100 commits the transaction in a new block to a shared ledger 112.

Figure 5B:
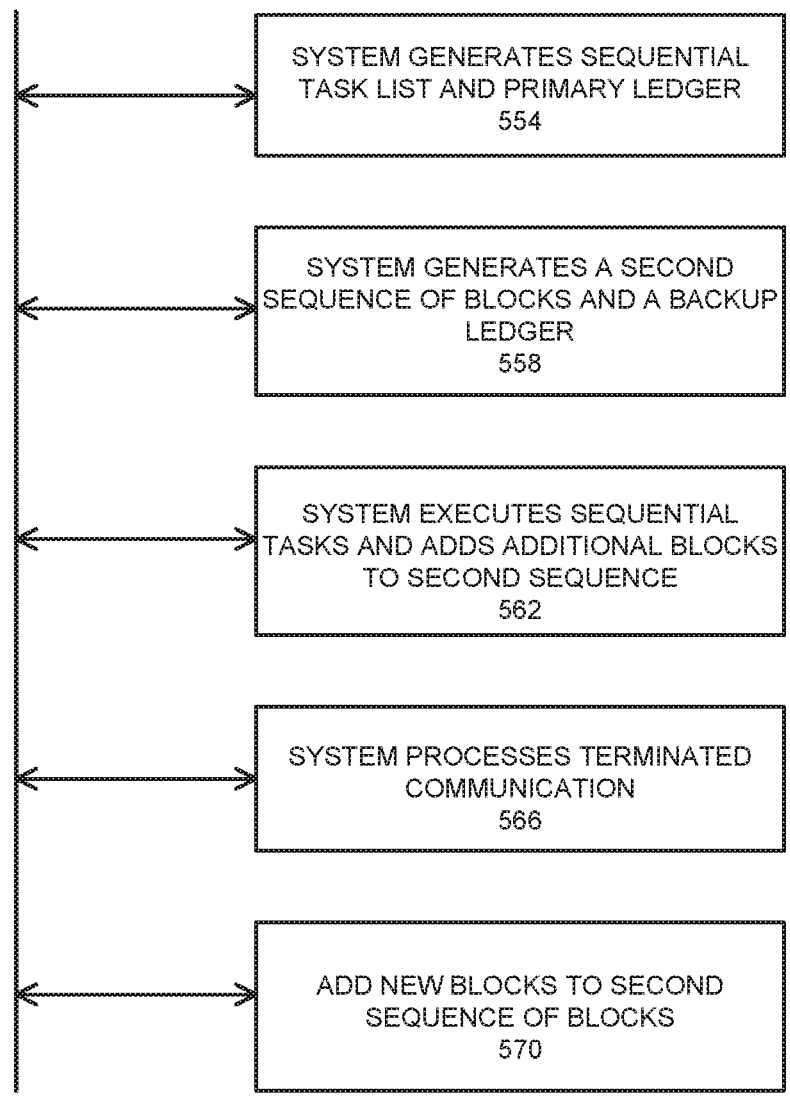
FIG. 5B illustrates a flow diagram of an example method of creating and maintaining a summary blockchain, according to example embodiments.

FIG. 5B illustrates a flow diagram 550 of an example method of creating and maintaining a summary blockchain, according to example embodiments. Referring to FIG. 5B, the method 550 may include one or more of the following steps.

At block 554, the system generates sequential tasks to be executed by the electronic systems. Then, the system generates a primary cryptographically verifiable ledger, i.e., a first cryptographically verifiable ledger represented by a first sequence of blocks. Each block contains one or more execution records associated with each of the sequential tasks, and each block contains a hash value associated with at least one previous block in the first sequence of blocks.

At block 558, the system then receives the sequential tasks over a period of time, and generates a backup cryptographically verifiable ledger, i.e., a second cryptographically verifiable ledger represented by a second sequence of blocks. The second sequence of blocks corresponds to at least a subset of the first sequence of blocks, which includes at least one block corresponding to the last task of the sequential tasks.

At block 562, the system executes tasks according to the sequential tasks, and adds additional blocks to the second sequence of blocks according to the executed task.

At block 566, the system determines whether the communication is terminated, for example, whether the communication between the system and a remote system has been lost. When it is determined that communication is not terminated, the process goes back to step 554 where the system continues to receive the sequential tasks. When the communication is terminated, the system further determines whether the at least one block in the second sequence of blocks, for example, the last block in the second sequence of blocks is authentic. The system further determines whether the last task conflicts with a current operation of the system. As the last block runs in parallel with the system's exception handling, this will allow an autonomous vehicle to accomplish the last received and authenticated blockchain task as long as it doesn't interfere with its exception handling. When there is no conflict, the autonomous vehicle will execute the last task of the sequential tasks.

At block 570, the system adds additional blocks to the second sequence of blocks according to the last executed task after the termination of communication. When the system determines the last task conflicts with the current operation of the system, the electronic system will execute the exception handling process. Similarly, when the system determines that the last block in the second sequence of blocks is not authentic, the exception handling process is executed. Then the system adds additional blocks to the second sequence of blocks according to the exception handling process executed by the system. The electronic system transmits additional blocks added to the second sequence of blocks according to the last task executed by the electronic system after the termination of communication, and the first sequence of blocks is updated based on the additional blocks. Then the system resumes transmitting the sequential tasks in response to communication resuming and receipt of the additional blocks.

In accordance with embodiments of the present disclosure, the system can create a summary sequence of blocks based on the first sequence of blocks, index the summary sequence of blocks of the first sequence of blocks, and generate a header of a new block to be concatenated to the first sequence of blocks based on the summary sequence of blocks. For example, the system can periodically create a "reader's digest summary" of the blockchain that must be agreed to by the members of block. Then the reader-digest summary can be used as a starting point for a new generation of the blockchain. With summary indexing to the supporting blockchain from which it was created, the summary provides a header for a next generation blockchain. This solves the problems of the blockchain getting too large over time, and eating up memory and processing time. This is also advantageous, for example, when the electronic system maintains the backup blockchain where storage and processing power may be limited or restricted. Allowing the system to maintain a summary blockchain can allow the electronic system to use less storage and less processing power.

Figure 6A:
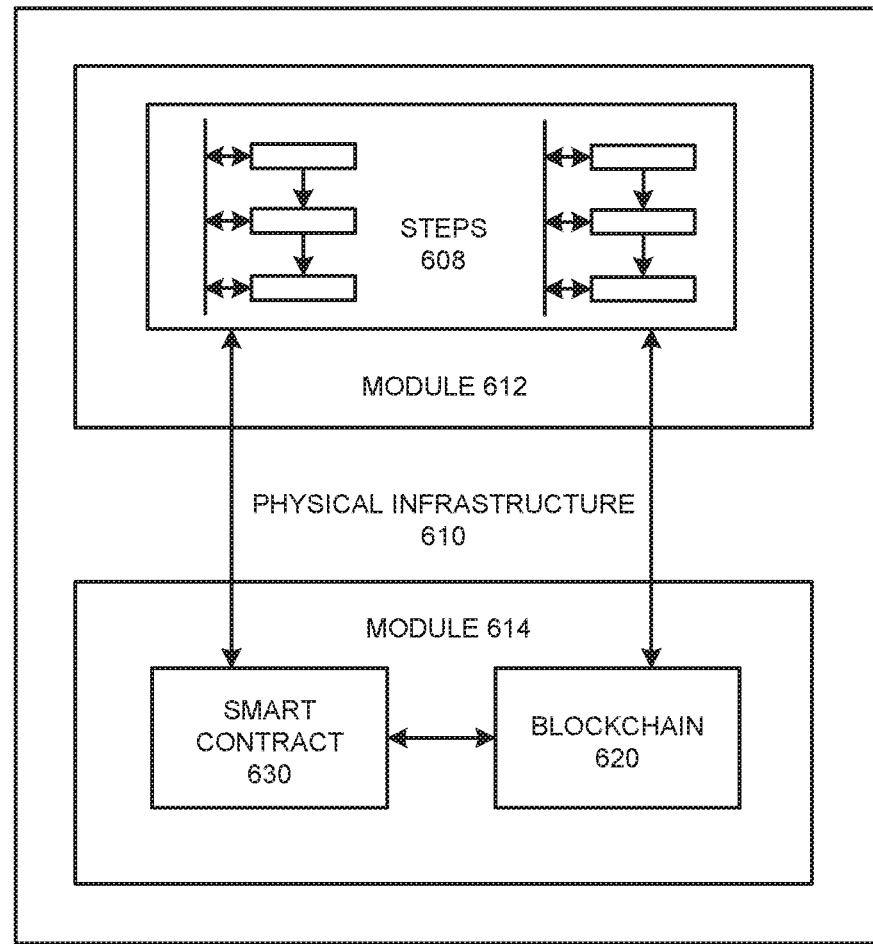
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
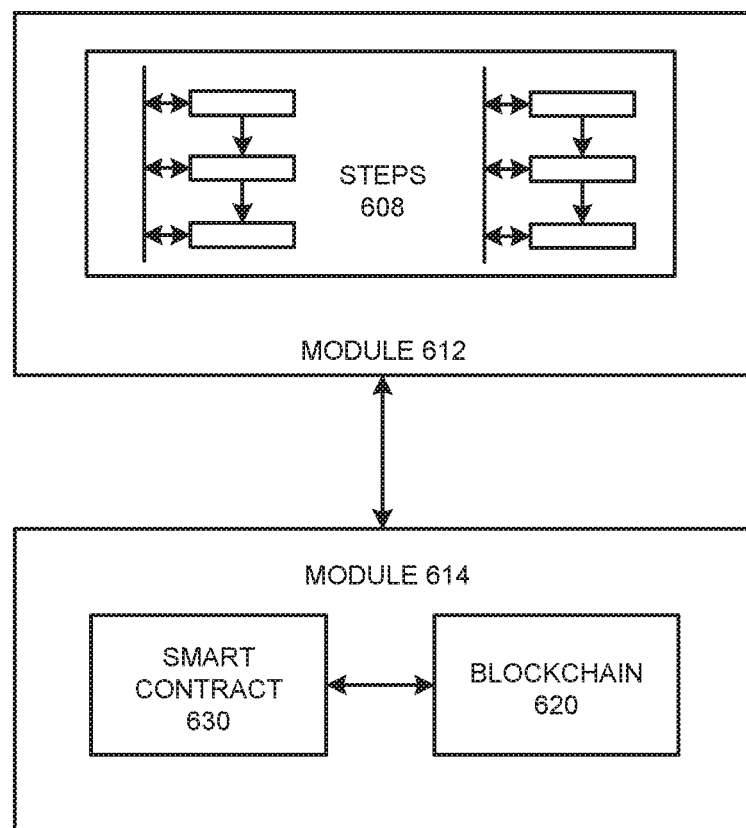
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
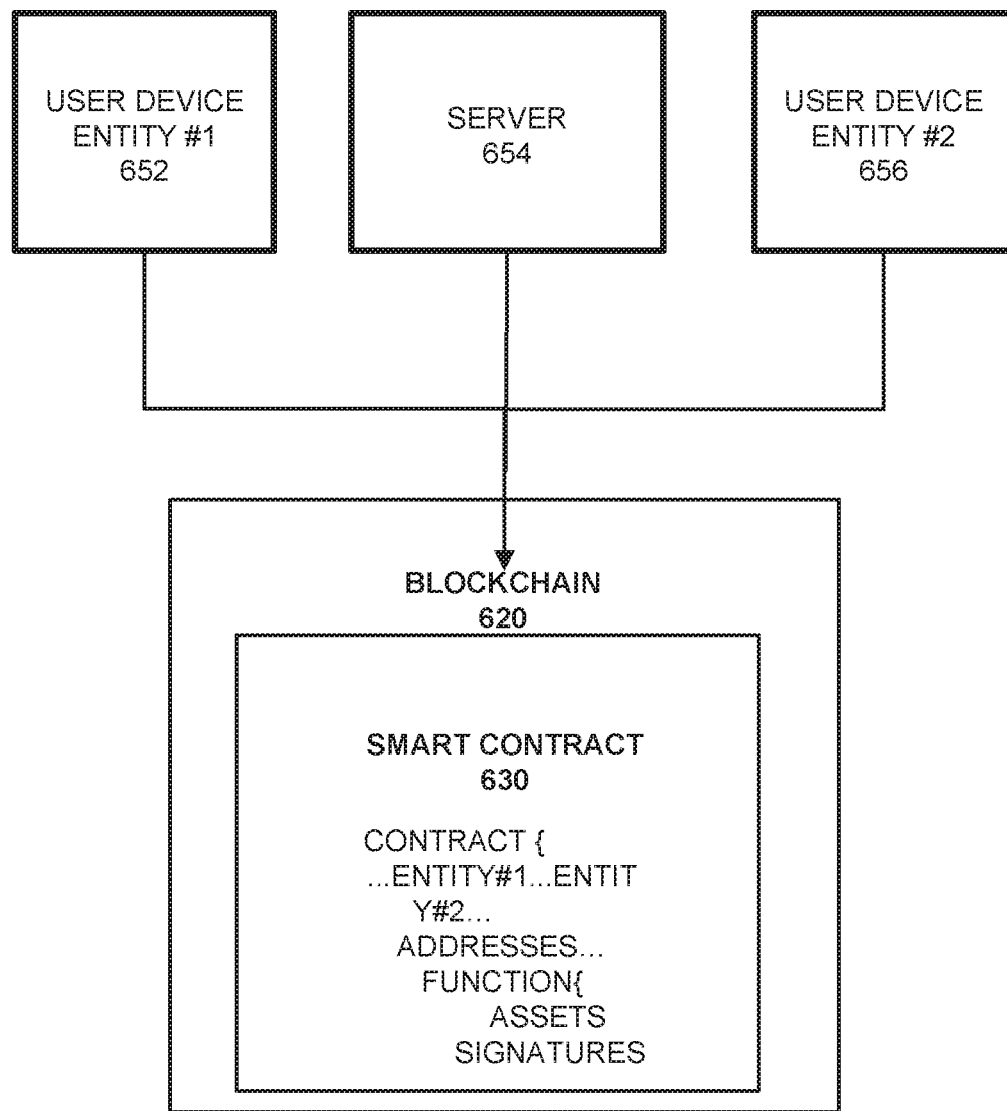
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
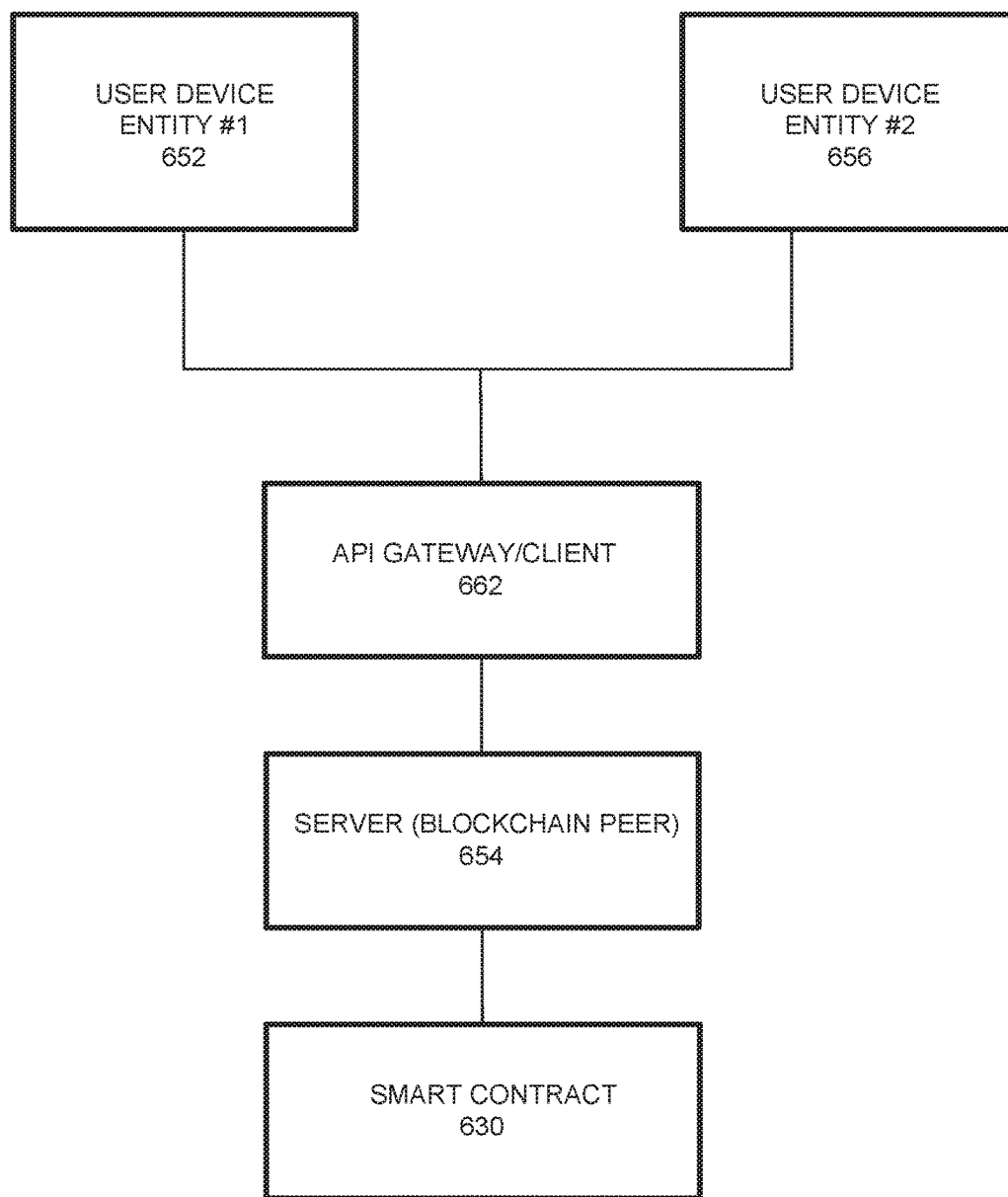
FIG. 6D illustrates an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
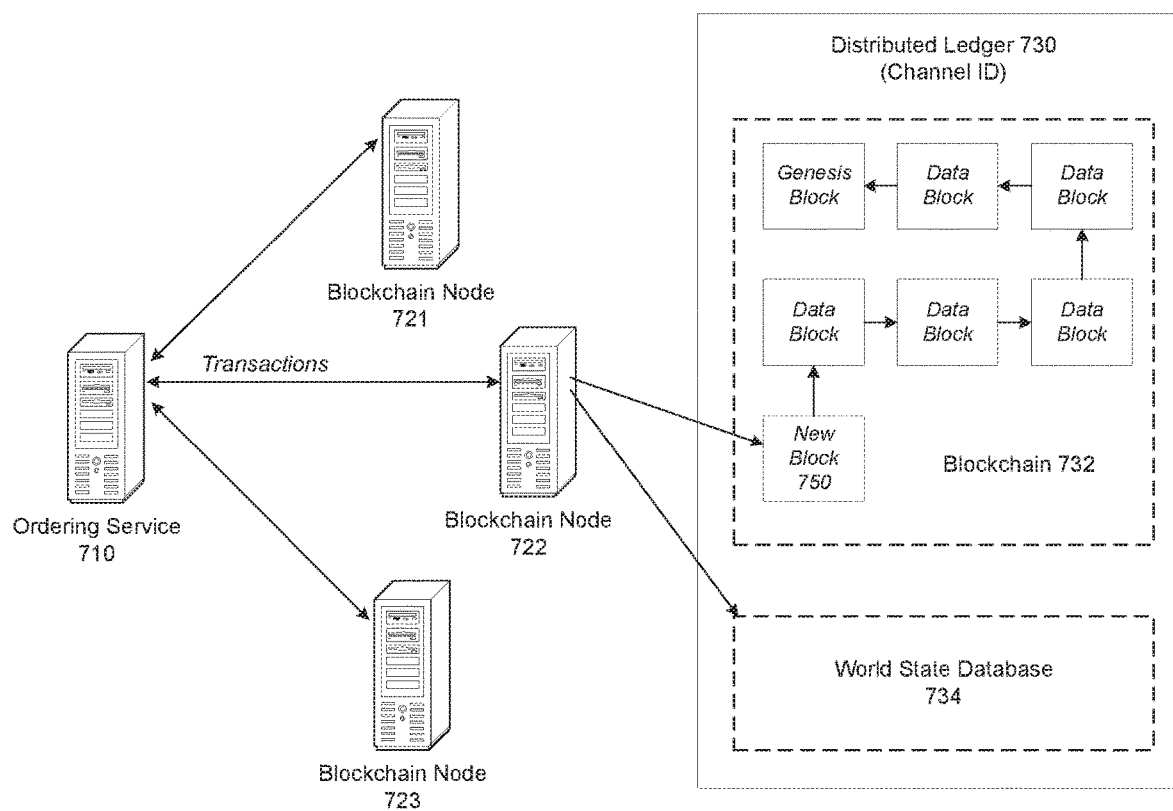
FIG. 7A illustrates a process of new data being added to a database, according to example embodiments.
Figure 7B:
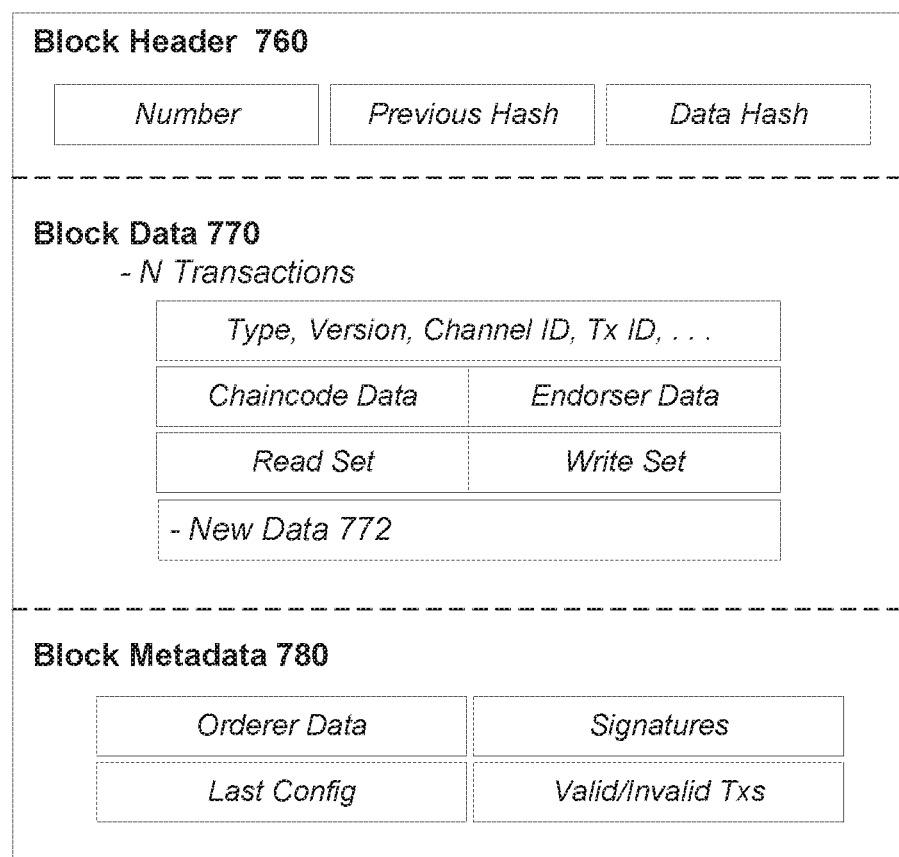
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode arguments, response status, namespace, a read set (list of key and version read by the transaction, etc.), a write set (list of key and value, etc.), a start key, an end key, a list of keys, one or more Merkle tree hashes, a read/write set, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
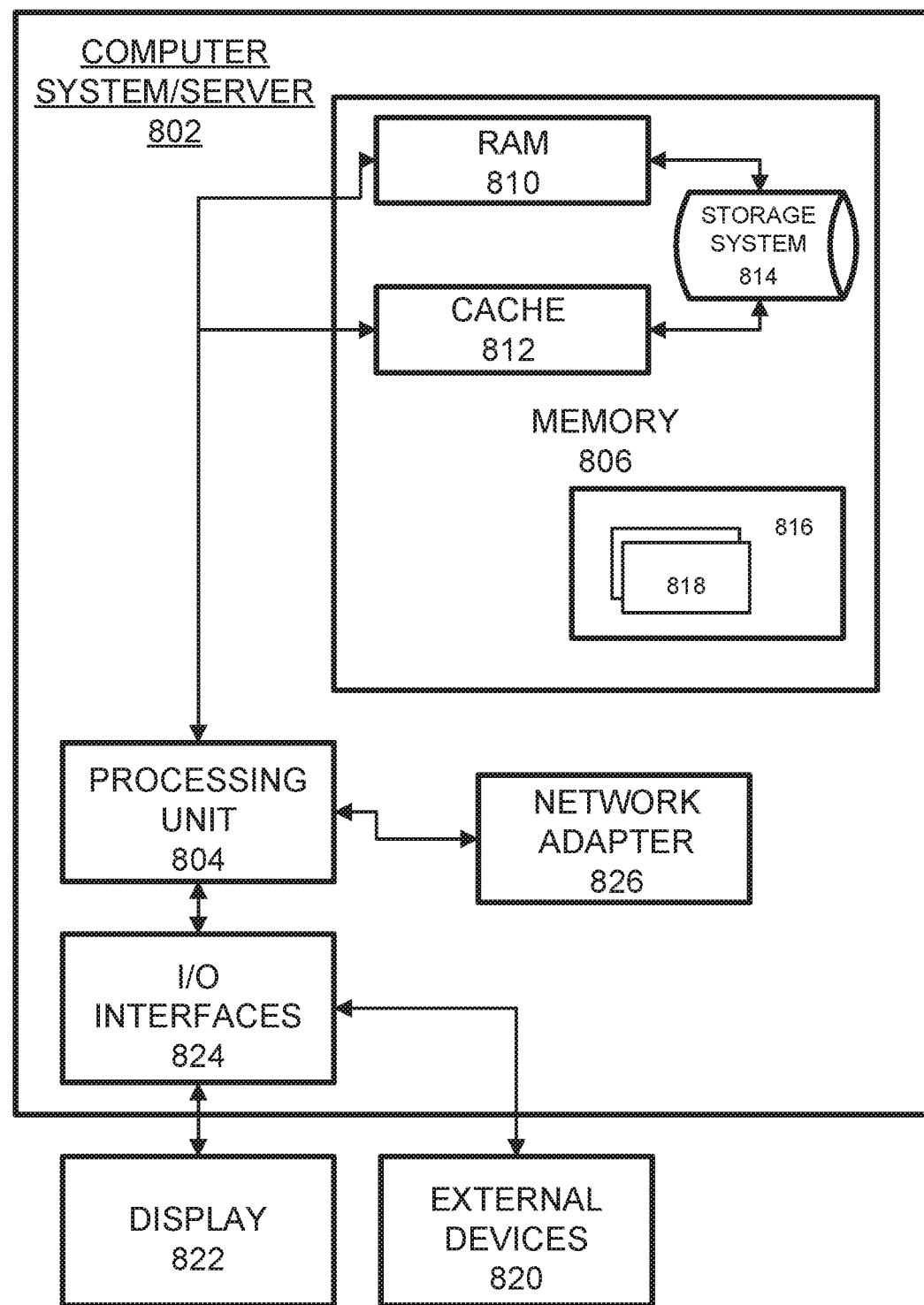
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a blockchain network, comprising:
a full storage peer, configured to:
receive a blockchain transaction;
execute chaincode to create a new world state; and
transfer, in response to the blockchain transaction, partial Merkle tree hashes that correspond to the blockchain transaction;
one or more partial storage peers, coupled to the full storage peer, each configured to:
receive the partial Merkle tree hashes;
verify a current world state hash with the partial Merkle tree hashes;
receive chaincode arguments;
execute chaincode on the chaincode arguments to generate a new world state;
calculate a new world state hash; and
participate in consensus on the new world state hash.

2. The system of claim 1, wherein in response to the one or more partial storage peers performs consensus on the new world state hash, the blockchain network commits the blockchain transaction and the new world state hash to a shared ledger of the blockchain network.

3. The system of claim 2, wherein the full storage peer comprises a full storage Merkle tree of the current world state hash.

4. The system of claim 3, wherein the one or more partial storage peers verifies the current world state hash comprises the one or more partial storage peers further configured to:
compute the current world state hash from a current read set and the partial Merkle tree hashes; and
verify the current world state hash matches a stored world state hash from the shared ledger.

5. The system of claim 3, wherein the new world state comprises a new write set, wherein the one or more partial storage peers calculates the new world state hash comprises each of the one or more partial storage peers configured to:
calculate new leaf node hashes for a partial Merkle tree that depend from a hash of the new write set, wherein the new leaf nodes are calculated based on the hash of the new write set and one or more partial Merkle tree hashes;
obtain, from the blockchain network, leaf node hashes for the martial Merkle tree that do not depend from the new write set; and
combine a calculated and an obtained leaf node hash to generate the new world state hash.

6. The system of claim 5, wherein the one or more partial storage peers caches one or more leaf node hashes, wherein the one or more partial storage peers uses cached leaf node hashes instead of leaf node hashes obtained from the blockchain network in response to the cached leaf node hashes have not changed.

7. The system of claim 2, wherein the partial Merkle tree hashes comprising a subset of a full Merkle tree maintained by the full storage peer.

8. A method, comprising:
receiving, by a full storage peer of a blockchain network, a blockchain transaction;
executing chaincode to create a new world state for a blockchain;
transferring, in response to the blockchain transaction, partial Merkle tree hashes to one or more partial storage peers, the partial Merkle tree hashes corresponding to the blockchain transaction;
verifying a current world state hash with the partial Merkle tree hashes;
receiving, by the one or more partial storage peers, chaincode arguments;
executing chaincode on the chaincode arguments to generate a new world state;
calculating a new world state hash; and
performing consensus, by the full storage peer and the one or more partial storage peers, on the new world state hash.

9. The method of claim 8, wherein in response to performing consensus the method further comprising:
committing the blockchain transaction and the new world state hash to a shared ledger of the blockchain network.

10. The method of claim 9, wherein the full storage peer comprising a full storage Merkle tree of the current world state hash.

11. The method of claim 10, wherein verifying the current world state hash comprising the one or more partial storage peers:
computing the current world state hash from a current read set and the partial Merkle tree hashes; and
verifying the current world state hash matches a stored world state hash from the shared ledger.

12. The method of claim 9, wherein the new world state comprising a new write set, wherein calculating the new world state hash comprising each of the one or more partial storage peers:
- calculating new leaf node hashes for a partial Merkle tree that depend from a hash of the new write set, wherein the new leaf nodes are calculated based on the hash of the new write set and one or more partial Merkle tree hashes;
- obtaining, from the blockchain network, leaf node hashes for the martial Merkle tree that do not depend from the new write set; and
- combining a calculated and an obtained leaf node hash to generate the new world state hash.

13. The method of claim 12, wherein the one or more partial storage peers caches one or more leaf node hashes, wherein the one or more partial storage peers uses cached leaf node hashes instead of leaf node hashes obtained from the blockchain network in response to the cached leaf node hashes have not changed.

14. The method of claim 9, wherein the partial Merkle tree hashes comprising a subset of a full Merkle tree maintained by the full storage peer.

15. A non-transitory computer readable medium comprising instructions, that when read by a processor, cause the processor to perform:
- receiving, by a full storage peer of a blockchain network, a blockchain transaction;
- executing chaincode to create a new world state for a blockchain;
- transferring, in response to the blockchain transaction, partial Merkle tree hashes to one or more partial storage peers, the partial Merkle tree hashes corresponding to the blockchain transaction;
- verifying a current world state hash with the partial Merkle tree hashes;
- receiving, by the one or more partial storage peers, chaincode arguments;
- executing chaincode on the chaincode arguments to generate a new world state;
- calculating a new world state hash; and
- performing consensus, by the full storage peer and the one or more partial storage peers, on the new world state hash.

16. The non-transitory computer readable medium of claim 15, wherein the full storage peer comprising a full storage Merkle tree of the current world state hash, wherein in response to performing consensus the method further comprising:
- committing the blockchain transaction and the new world state hash to a shared ledger of the blockchain network.

17. The non-transitory computer readable medium of claim 16, wherein verifying the current world state hash comprising the one or more partial storage peers:
- computing the current world state hash from a current read set and the partial Merkle tree hashes; and
- verifying the current world state hash matches a stored world state hash from the shared ledger.

18. The non-transitory computer readable medium of claim 16, wherein the new world state comprising a new write set, wherein calculating the new world state hash comprising each of the one or more partial storage peers:
- calculating new leaf node hashes for a partial Merkle tree that depend from a hash of the new write set, wherein the new leaf nodes are calculated based on the hash of the new write set and one or more partial Merkle tree hashes;
- obtaining, from the blockchain network, leaf node hashes for the martial Merkle tree that do not depend from the new write set; and
- combining a calculated and an obtained leaf node hash to generate the new world state hash.

19. The non-transitory computer readable medium of claim 18, wherein the one or more partial storage peers caches one or more leaf node hashes, wherein the one or more partial storage peers uses cached leaf node hashes instead of leaf node hashes obtained from the blockchain network in response to the cached leaf node hashes have not changed.

20. The non-transitory computer readable medium of claim 16, wherein the partial Merkle tree hashes comprising a subset of a full Merkle tree maintained by the full storage peer.

* * * * *